(12) United States Patent
Kaitha

(10) Patent No.: US 12,184,502 B2
(45) Date of Patent: *Dec. 31, 2024

(54) MESSAGE MANAGEMENT SYSTEM FOR ADJUSTING A TRANSMISSION OF A SCHEDULED MESSAGE

(71) Applicant: Capital One Services, LLC, McLean, VA (US)

(72) Inventor: Sunil Kaitha, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/459,620

(22) Filed: Sep. 1, 2023

(65) Prior Publication Data

US 2023/0412465 A1 Dec. 21, 2023

Related U.S. Application Data

(63) Continuation of application No. 17/649,491, filed on Jan. 31, 2022, now Pat. No. 11,750,465.

(51) Int. Cl.
*H04L 41/12* (2022.01)
*H04L 43/0805* (2022.01)

(52) U.S. Cl.
CPC .......... *H04L 41/12* (2013.01); *H04L 43/0805* (2013.01)

(58) Field of Classification Search
None
See application file for complete search history.

(56) References Cited

U.S. PATENT DOCUMENTS

| | | |
|---|---|---|
| 10,445,152 B1 * | 10/2019 | Zhang ................. G06F 16/1744 |
| 11,750,465 B2 | 9/2023 | Kaitha |
| 2014/0372525 A1 * | 12/2014 | Raghavan .......... G06Q 10/1093 709/204 |
| 2018/0005323 A1 * | 1/2018 | Grassadonia .......... G06Q 40/02 |
| 2019/0349269 A1 * | 11/2019 | Li ........................ H04M 15/785 |
| 2020/0151744 A1 * | 5/2020 | Chopra ............. G06Q 30/0202 |
| 2021/0056553 A1 * | 2/2021 | Howard ............. G06Q 20/3224 |
| 2021/0174221 A1 * | 6/2021 | Vijapur Gopinath Rao ................ G06N 20/00 |
| 2021/0304027 A1 * | 9/2021 | Damodaran ............. G06N 3/08 |

* cited by examiner

*Primary Examiner* — Fadi Haj Said
(74) *Attorney, Agent, or Firm* — Harrity & Harrity, LLP

(57) ABSTRACT

In some implementations, a system may receive a status associated with a service of a user account. The system may schedule, based on the status, a transmission of a message at an expiration of a time period, wherein the message is generated to indicate the status. The system may monitor, during the time period, the status to detect an event associated with the service. The system may detect, based on an occurrence of the event, an update to the status. The system may perform, prior to the expiration of the time period, an action associated with the message to account for the update to the status.

20 Claims, 8 Drawing Sheets

US 12,184,502 B2

MESSAGE MANAGEMENT SYSTEM FOR ADJUSTING A TRANSMISSION OF A SCHEDULED MESSAGE

RELATED APPLICATION

This application is a continuation of U.S. patent application Ser. No. 17/649,491, filed Jan. 31, 2022 (now U.S. Pat. No. 11,750,465), which is incorporated herein by reference in its entirety.

BACKGROUND

A message management system may communicate with a user of an account managed by the message management system. The message management system may manage information associated with the user and/or records associated with the user. The message management system may send a message to the user to provide a status of the account that is based on the information and/or the records. The message management system may receive a message from the user, a system that manages the information, or a system that manages the records.

SUMMARY

Some implementations described herein relate to a system for message management. The system may include one or more memories and one or more processors communicatively coupled to the one or more memories. The system may be configured to receive a message scheduling notification associated with a service of a user account. The system may be configured to determine, via the user account, a status associated with the service. The system may be configured to generate a message that includes information that is associated with the status. The system may be configured to schedule a transmission of the message at an expiration of a time period. The system may be configured to detect, prior to the expiration of the time period, an event associated with the user account and the service. The system may be configured to determine, based on detecting the event, an update to the status. The system may be configured to adjust, prior to the expiration of the time period, the message or the transmission of the message to account for the update to the status.

Some implementations described herein relate to a non-transitory computer-readable medium that stores a set of instructions for a device. The set of instructions, when executed by one or more processors of the device, may cause the device to determine a status associated with a user account. The set of instructions, when executed by one or more processors of the device, may cause the device to schedule a transmission of a message at an expiration of a time period. The set of instructions, when executed by one or more processors of the device, may cause the device to detect, prior to the expiration of the time period, an event associated with the user account and the service. The set of instructions, when executed by one or more processors of the device, may cause the device to determine, based on detecting the event, an update to the status. The set of instructions, when executed by one or more processors of the device, may cause the device to perform, prior to the expiration of the time period, an action associated with the message to account for the update to the status.

Some implementations described herein relate to a method for managing user account messaging. The method may include receiving, by a device, a status associated with a service of a user account. The method may include scheduling, by the device and based on the status, a transmission of a message at an expiration of a time period, where the message is generated to indicate the status. The method may include monitoring, by the device and during the time period, the status to detect an event associated with the service. The method may include detecting, by the device and based on an occurrence of the event, an update to the status. The method may include performing, by the device and prior to the expiration of the time period, an action associated with the message to account for the update to the status.

DETAILED DESCRIPTION

Figure 1A:
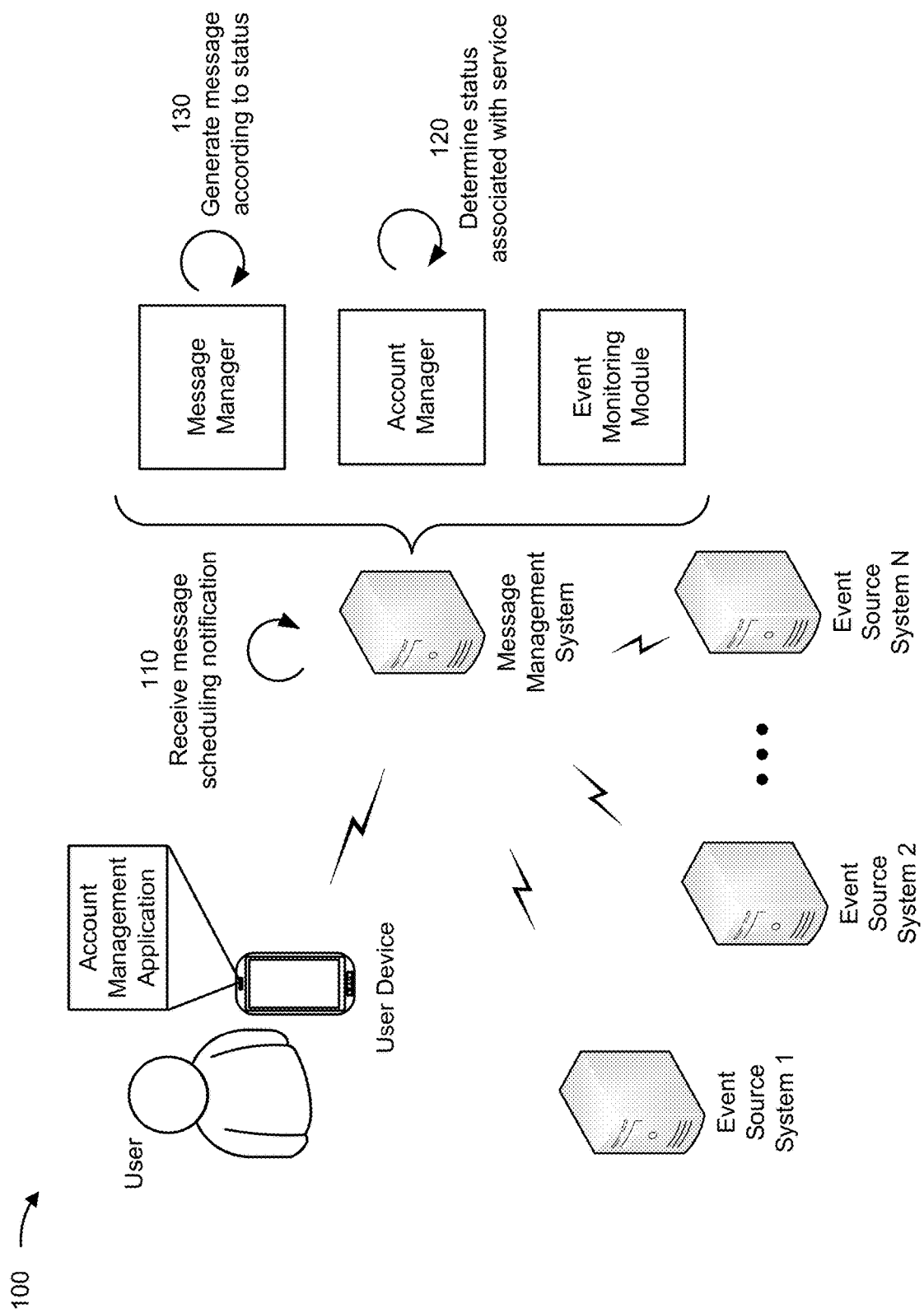
FIGS. 1A-1C are diagrams of an example implementation relating to message management for a user account.

The following detailed description of example implementations refers to the accompanying drawings. The same reference numbers in different drawings may identify the same or similar elements.

A message management system is typically tasked with pushing messages to multiple users during a certain time period or under certain conditions. Due to the quantity of messages that are to be generated and transmitted, the message management system may schedule transmissions of the messages to the users at future moments in time. For example, because the message management system may need to transmit tens of thousands of messages, hundreds of thousands of messages, millions of messages, or more, the message management system may determine statuses of the accounts of the customers in advance to ensure that the message management system has enough time and resources to transmit the messages at an appropriate time or during an appropriate time period. However, after the transmission of a message is scheduled, a status of the account that is associated with the message may be updated (e.g., due to an action by the user or another system associated with the status). In such a case, the content or information within the message may be inaccurate and/or outdated. Accordingly, a message management system that transmits such a message may waste computing resources (e.g., processor and/or memory resources used to execute the transmission) and/or communication resources (e.g., bandwidth and/or network resources used to transmit and/or receive the message) by sending the message, because the message is inaccurate and/or outdated, which can degrade a user experience and/or cause confusion.

As a more specific example, when a customer of a financial institution is to make a payment to a credit account associated with the financial institution, the financial institution may utilize the message management system to transmit a notification that the customer is to make a payment. The notification may indicate a minimum value for the payment, a balance associated with the credit account, and/or a time at which the payment is due. In such a case, due to an amount of time and/or resources required for the message management system to process accounts of all customers with payments due on a given date, the financial institution may schedule transmissions of messages based on individual analyses of the accounts of the users prior to a scheduled time for transmitting the messages to those customers (e.g., a time that is before the due date). However, if a customer makes a payment, the generated message that is scheduled for transmission may indicate an inaccurate balance due, or that a minimum payment is required (if the payment was greater than the minimum payment due).

Some implementations described herein provide a message management system that enables a transmission of a message associated with an account to be adjusted based on an update to a status of the account. For example, the message management system may schedule a transmission of a message based on a status associated with a service involving a user account, monitor the status of the user account (e.g., based on information from an event source system associated with providing or managing the service), and adjust the transmission of the message based on detecting an event that updates the status. The message management system may adjust the transmission by adjusting the information in the message, recalling the scheduling of the transmission of the message, rescheduling the transmission of the message (e.g., to a different date), and/or scheduling transmission of another message that is different from the message.

In this way, the message management system may conserve resources that would otherwise be wasted in transmitting inaccurate or outdated information. Furthermore, the message management system may enable the message management system to provide more accurate and/or up-to-date information relative to other systems that do not implement the systems and/or processes described herein. Accordingly, the message management system may avoid consumption of resources (e.g., customer service resources) that would otherwise be consumed to address customer confusion or dissatisfaction involving the inaccurate or outdated messages.

Figure 1B:
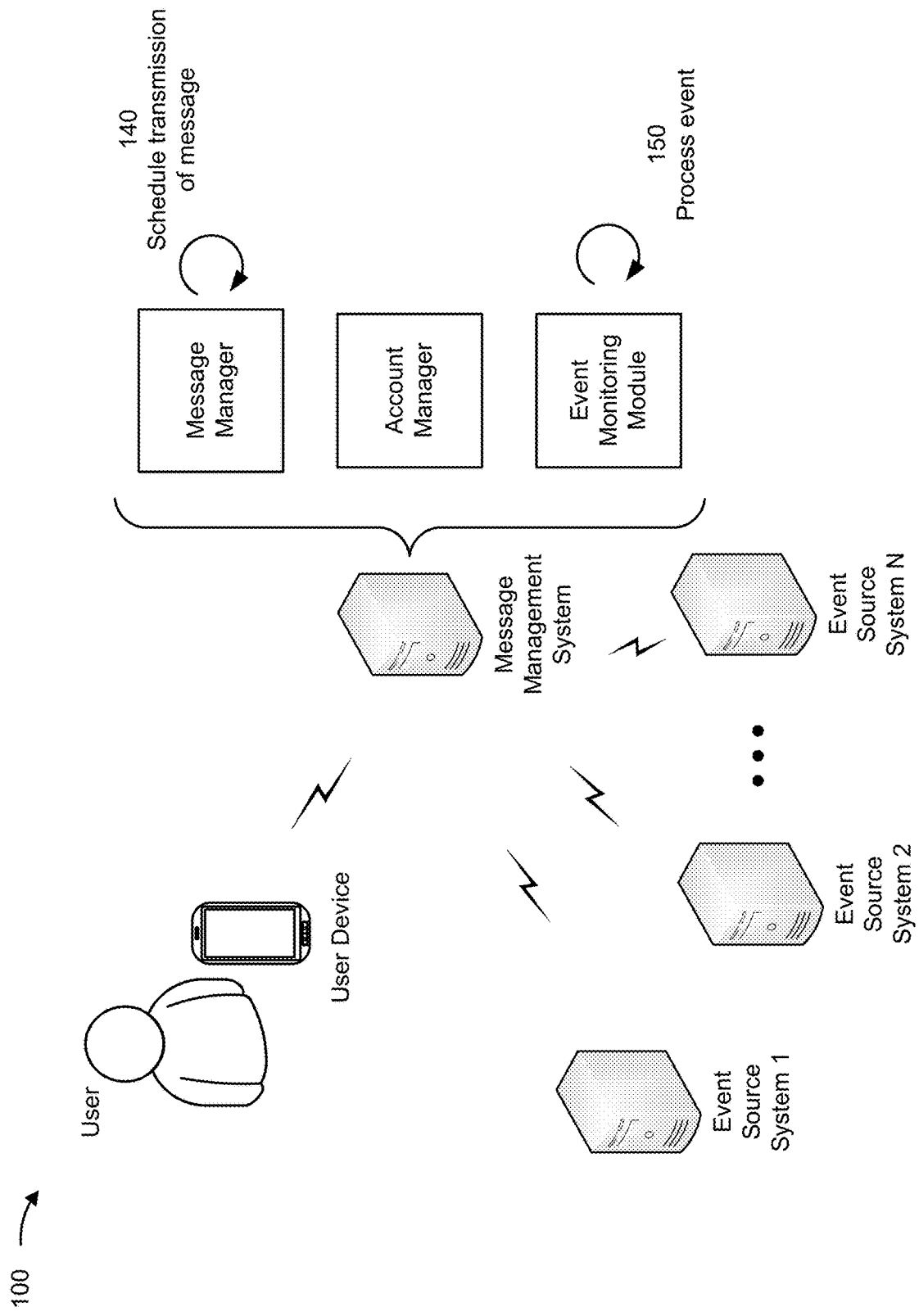
Figure 1C:
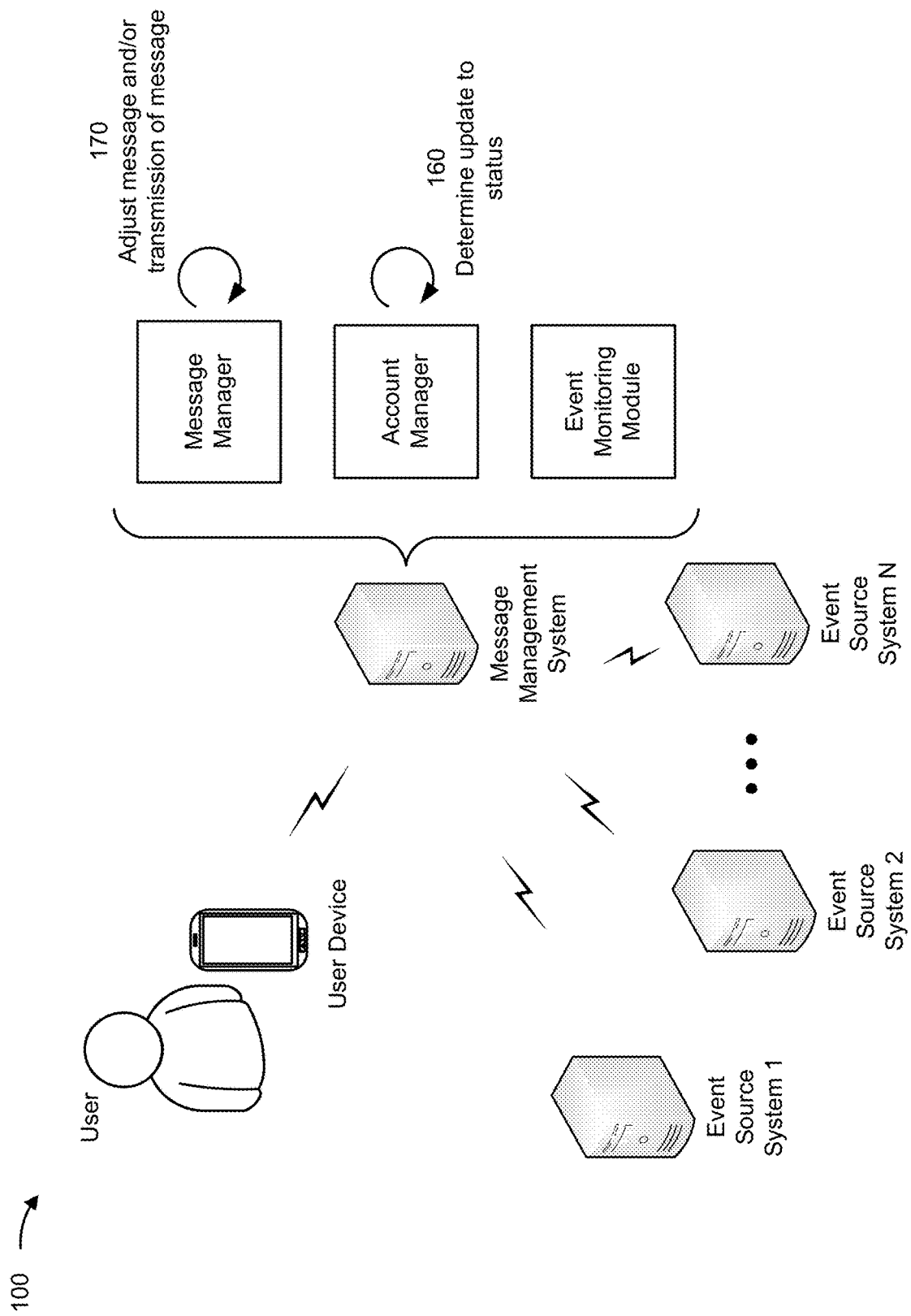

FIGS. 1A-1C are diagrams of an example implementation 100 relating to message management for a user account. As shown in FIGS. 1A-1C, example implementation 100 includes a message management system, a user device of a user, and one or more event resource systems. As shown, the message management system may include or be associated with a message manager, an account manager, and an event monitoring module. These devices are further described below at least in connection with FIG. 4 and FIG. 5.

The user device may include an application (Account Management Application) that is associated with the message management system. For example, the message management system may be associated with a backend system of the application, and the user device may include a user-side version of the application that enables the user to interact with a user account that is associated with the user. The user account and/or the application may be used by an entity associated with the message management system to provide a service to the user. Additionally, or alternatively, the user may receive a service provided by the entity via the user account and/or the application.

The entity may be an owner of the message management system and/or an organization that manages the message management system. For example, the entity may be a financial institution that utilizes the message management system to manage a financial account (e.g., a checking account, a savings account, an investment account, and/or a credit account, among other examples) associated with the user and/or to provide a financial service to the user. While certain examples are described herein in connection with a financial institution, a financial account, and/or a financial service, other examples may similarly apply. For example, the entity may be a retailer that utilizes the message management system to manage a member services account (e.g., a rewards account or loyalty member account) and/or provide a customer service to the user; the entity may be a transportation service provider that utilizes the message management system to manage a transportation account (e.g., a travel account, a rideshare account, and/or a delivery account) associated with the user and/or provide a transportation service to the user; and/or the entity may be a security organization that utilizes the message management system to manage a security account (e.g., a home security account and/or an identity security account) associated with the user and/or provide a security service to the user, among other examples.

As shown in FIG. 1A, and by reference number 110, the message management system may receive a message scheduling notification. For example, the message scheduling notification may be received based on a messaging event occurring in association with a service provided to the user via the user account (and/or the message management system detecting an occurrence of the messaging event). The message scheduling notification may be received and/or generated by the event monitoring module. Additionally, or alternatively, the message scheduling notification may be received from an event source system (based on the event source system processing or detecting an event associated with the service) and/or the user device (e.g., based on the user interacting with the user account via the application).

The messaging event may be a scheduled event that is triggered in association with providing the service to the user according to a particular date or time associated with the service. As an example, the messaging event may be scheduled to occur at a time that is prior to a due date that involves a user activity. For example, for a financial account managed by the message management system, the messaging event may be designated to occur at a fixed time that is prior to a payment due date associated with a financial account. In such a case, the scheduled messaging event may prompt the message management system to generate and send a message to the user (e.g., to remind the user to make the payment), as described elsewhere herein.

Additionally, or alternatively, the messaging event may be a trigger event that prompts the message management system to generate and/or schedule a transmission of a message associated with the service. The messaging event may be associated with certain activities that are monitored by the message management system and/or the event source systems. For example, the certain activities may include monitoring a location of the user and/or a location where the service is provided in association with the user account (e.g., in association with a fraud detection service or fraud prevention service provided by a financial institution). In such a case, the message scheduling notification may be received in association with a use of the user account outside of an authorized area (e.g., a home area associated with the user, an area that is designated as an authorized area by the user, and/or an area that is determined to be an authorized area according to previous uses of the user account).

As described herein, the message management system may perform a service in association with managing a record log associated with the user account. For example, the record log may include records that are associated with the user utilizing or receiving the service. Accordingly, the records may be associated with exchanges associated with a financial account associated with the user (e.g., payments, credits, withdrawals, or other transactions involving the financial account), user interactions involving use of the service in association with the user account (e.g., communications or indications of an authorized area of use of the user account), and/or user interactions associated with authenticating an authorized user of the account (e.g., communications or indications of authentication information that is used to authenticate a use of the user account and/or a receipt of the service via the user account). In some implementations, the records may be utilized to indicate a status associated with the service (e.g., a status associated with the user receiving the service, a status associated with the user engaging in an activity associated with the service, a status associated with an authentication of the user, a status associated with a location of the user and/or a location of receiving the service, or the like). Additionally, or alternatively, the message management system may perform the service in association with monitoring information associated with the user.

As further shown in FIG. 1A, and by reference number 120, the message management system determines a status associated with the service. For example, the account manager of the message management system may determine the status associated with the service. The status of the user account may be updated and/or managed in association with one or more parameters for receiving the service and/or engaging with the service. For example, regarding a service that involves managing and/or facilitating exchanges associated with a financial account, the status may indicate one or more parameters associated with the financial account, such as a minimum payment amount for an upcoming payment, a balance associated with the financial account, a due date of an upcoming payment, and so on.

In some implementations, the message management system may determine the status based on information in the message scheduling notification. For example, the message scheduling notification may include status information associated with the user account. Referring to the financial account example above, the message scheduling notification may include the minimum payment amount, the balance, and/or the date of a due payment. As another example, the message scheduling notification may indicate a location of a use of the user account, such as a location received from the user device and/or a location identified in association with an exchange (or transaction) involving the financial account.

In some implementations, the account manager may determine the status based on an analysis of a record log associated with the user receiving the service. For example, the account manager may determine, from one or more parameters identified in one or more records of the record log, whether the user has made a sufficient payment to a financial account that is managed by the message management system (e.g., a payment in association with an upcoming payment due date). In such a case, if a sufficient payment has been made (e.g., a payment that satisfies a minimum payment due by the due date), then the message management system may determine that no payment is due. On the other hand, if the message management system determines that a sufficient payment has not been made, then the message management system may determine one or more parameters associated with the service (e.g., a minimum payment due, a balance associated with the financial account, or the like).

Additionally, or alternatively, the account manager may determine the status based on a status field and/or status indicator associated with a service provided to the user. For example, the status may indicate an authorized area associated with utilizing the user account in association with receiving the service. In such a case, the status may indicate whether the user is within the authorized area, whether a use (e.g., a use within a most recent time period) of the user account occurred (e.g., in an exchange or transaction) within the authorized area, or the like. In some implementations, the status of the user account may indicate authentication information associated with authorized users of the user account that are authorized to receive the service (e.g., identification information or biometric information associated with authorized users of the user account).

As further shown in FIG. 1A, and by reference number 130, the message management system may generate a message according to the status. For example, the message manager of the message management system may generate the message based on the determined status. More specifically, the message manager may generate the message to include information associated with the status. Such information may identify a parameter associated with the service. For example, for a service involving a financial account, the information may include a value for a balance associated with the user account, a value of a minimum payment due, a due date for an upcoming payment, or the like. Additionally, or alternatively, for a service involving authorizing use of an account based on a location, the message management system may generate a message to identify a location of a recent use of the user account (e.g., as indicated by a corresponding record of the record log), or authentication information associated with a user involved in a recent use of the account, among other examples).

As shown in FIG. 1B, and by reference number 140, the message management system schedules a transmission of the message. For example, the message manager of the message management system may schedule the transmission. The message management system may schedule the transmission to occur at a particular time. For example, the particular time may correspond to an expiration of a time period. The time period may be between a time at which the transmission is scheduled and a time of the scheduled transmission, between a time at which an event associated with the service occurs (e.g., an event that triggers transmission of the message scheduling notification) and a time of the scheduled transmission (which may be based on a characteristic of the event and/or the service), and/or a fixed time period associated with transmitting the message in association with providing the service (e.g., monthly, weekly, quarterly, or the like). Accordingly, a duration of the time period may be based on a length of time between a notification time at which a message scheduling notification that is associated with the service is received and a fixed time at which the message is to be transmitted in association with the user receiving the service.

In some implementations, a duration of the time period may be based on a type of the service or the status of the service. For example, a duration of the time period for sending a message in association with a reminder service for making a payment may be different than a duration of a time period for sending a message in association with verifying a location of the user (e.g., in association with a use of the service in an unexpected area or unauthorized area). Accordingly, the message management system may schedule the transmission based on the service, a status of the service, and/or an event that occurred in association with the user receiving the service.

As further shown in FIG. 1B, and by reference number 150, the message management system processes an event. For example, the message management system may receive, from an event source system, an event notification associated with an event that is associated with the service. The event may occur prior to the time of the scheduled transmission. Accordingly, the message management system may detect an occurrence of an event associated with the user account and the service prior to the expiration of the time period, which is when the message is scheduled to be transmitted.

In some implementations, the message management system may monitor, during the time period prior to the time of the scheduled transmission, an event source system associated with processing events associated with the service. In such a case, the message management system may detect the event based on the event source system processing event information associated with the event (e.g., creating and/or storing a record associated with the event in a record log, such as an exchange record associated with a payment).

The event notification may indicate an update to the status of the user account. For example, the occurrence of the event may cause an adjustment to a parameter of the service. The event may involve the user interacting with the user account in association with receiving the service and/or the user engaging with the service (e.g., the user using the service via the user account, such as to engage in an exchange). In some implementations, the message management system may detect the event based on detecting a user input associated with the user interacting with the user account (e.g., a user input to make a payment, a user input to update a location of the user and/or an authorized area of the user, and so on).

For example, the event notification may indicate that the user made a payment in association with a financial account of the user. In such a case, the event may involve an adjustment to a balance of a financial account associated with the user and/or that is hosted by the message management system in association with a providing a financial service. As another example, the event notification may indicate that the user updated a location and/or an authorized area of use of the user account. In such a case, the event may involve an adjustment to an authorized area that includes a location of the user of the user account. (e.g., to indicate that the user is traveling outside of a home area or other previously designated authorized area).

In some implementations, the message management system, via the event monitoring module, may detect the event based on processing an event notification from one or more of the event source systems. Additionally, or alternatively, the event monitoring module may detect the event based on querying the event source system prior to a designated time of the scheduled transmission of the message (e.g., prior to the expiration of the time period). For example, the event monitoring module may query the event source system to pull the event notification from the event source system. Correspondingly, the message management system may receive, from the event source system, a response that indicates an occurrence of the event.

In this way, the message management system may process and/or detect an event associated with the service and/or the message that is scheduled to be transmitted.

As shown in FIG. 1C, and by reference number 160, the message management system determines the update to the status. The message management system may determine the update based on detecting the occurrence of the event and/or receiving an event notification associated with the event. For example, the account manager of the message management system may determine the update to the status based on a characteristic of the event (as indicated in an event notification from the event source system, as indicated in a record generated and/or stored by the event source system, and so on). The update may involve a change to a parameter associated with providing a service to the user of the user device (e.g., a payment management parameter that indicates whether a payment from the user is due or an amount of a payment that is due, a fraud parameter associated with monitoring fraud involving the user account of the user, a location parameter associated with monitoring a location of the user, or the like). In some implementations, the message management system determines the update based on a response to a query to the event source system. The response may include update information that identifies a change to the status, a change to a parameter of the service, and/or a characteristic of the event (e.g., when the event occurred, where the event occurred, a party involved in the event, a type of the event, a service involved in the event, among other examples).

In this way, the message management system may determine that the update to the status includes an adjustment to the user account that corresponds to the type of the event and/or the occurrence of the event.

As further shown in FIG. 1C, and by reference number 170, the message management system may adjust the message and/or the transmission of the message. For example, the message management system may adjust the message or the transmission of the message prior to the expiration of the time period to account for the update to the status (e.g., because the content of the message would be obsolete if transmitted at the scheduled time without adjustment). Accordingly, the message management system may adjust information in the message to more accurately reflect the status of the user account in association with providing the service.

Additionally, or alternatively, the message management system may cancel the transmission of the message based on the occurrence of the event making the status outdated (e.g., if the message is no longer necessary to provide the service, due to the occurrence of the event). For example, the message management system may recall the scheduling of the transmission of the message if the message indicates that a payment is due, but the user makes a payment that satisfies a minimum threshold or that is greater than or equal to a balance associated with a financial account. In some implementations, the message management system may reschedule the transmission of the message to a different transmission time other than the expiration of the time period (e.g., to a later date or time).

In some implementations, the message management system may adjust the message to form an updated message that includes updated information that is associated with the adjustment to the parameter (e.g., an updated amount due for a partial payment made in association with a financial account). The message management system may transmit, to the user device associated with the user account, the updated message to provide the updated information.

In some implementations, the message management system may use a machine learning model to identify and/or determine an adjustment to a message (e.g., adjustment to a transmission of the message, an adjustment to content within the message, or the like). The machine learning model may include and/or be associated with one or more of a neural network, a random forest model, a clustering model, a classification model, a regression model, or the like. In some implementations, the machine learning model may include and/or be associated with a natural language processing model to analyze the message and/or adjust content of the message.

The machine learning model may be trained (e.g., by the message management system or another system associated with the message management system) based on one or more parameters associated with adjusting the message and/or the transmission of the message, such as a characteristic of the message, a type of the event, an update to a status, which event source system is associated with the event, a schedule associated with the transmission of the message, and/or the like. The message management system may train the machine learning model, according to the one or more parameters, using historical data associated with previously adjusted messages based on previously detected events (e.g., associated with the event source systems and/or the message management system). Using the historical data and the one or more parameters as inputs to the machine learning model, the message management system (or another system associated with the message management system) may determine the adjustment to the message (e.g., to the transmission and/or to the content) to ensure that the message that is transmitted is up to date.

The message management system may schedule a transmission of another message that is different from the message. For example, rather than send a notification that use of the user account was detected in an unexpected location (or outside of an authorized area), if the status of the user account was updated with the user's location, the message may be replaced with a verification message that confirms the location of the user.

Accordingly, the message management system may perform an action associated with the message to account for the update to the status prior to the expiration of the time period, thereby enabling a more (or most) up-to-date message to be transmitted to the user.

In this way, as described herein, the message management system may adjust a transmission or a message to provide an accurate or up-to-date message to a user in order to prevent customer confusion and avoid wasting resources that would otherwise be consumed by executing transmission of an inaccurate or outdated message.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
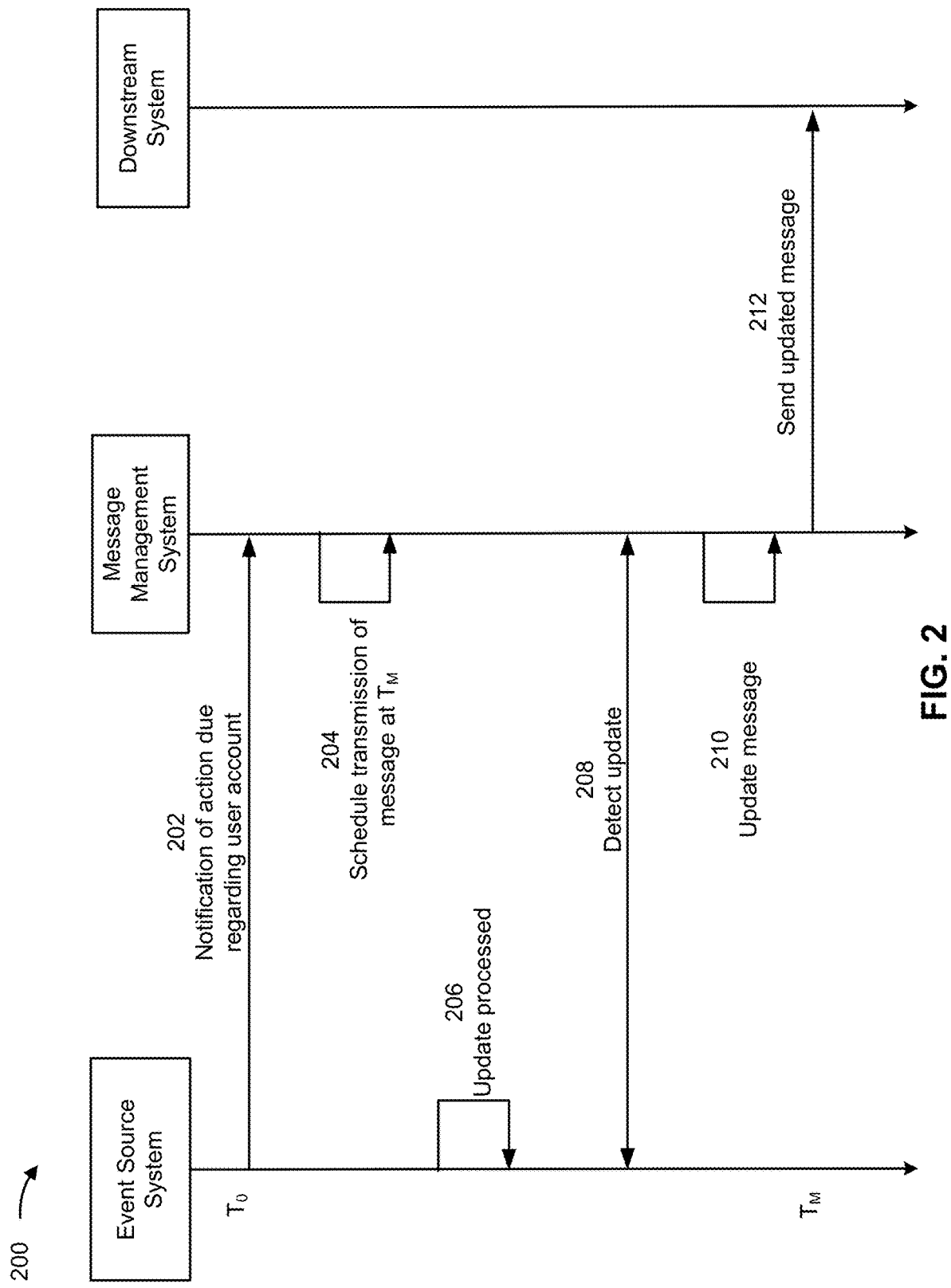
FIGS. 2 and 3 are diagrams illustrating one or more example call flows associated with managing messages for a user account, as described herein.

FIG. 2 is a diagram illustrating an example call flow 200 associated with managing a message for a user account. As shown in FIG. 2, a message management system, an event source system, and a downstream system and/or user device may communicate with one another. The downstream system may include user device that is associated with a user and/or may be used, by the user, to manage a user account, as described herein.

As shown by reference number 202, at time $T_0$, the event source system provides a notification of an action due regarding a service associated with a user account. The notification (e.g., a message scheduling notification) may be transmitted based on a status of the user engaging with or receiving the service. As shown by reference number 204, the message management system schedules a transmission of a message at time T M. The message may be generated based on a status of the account, as described herein.

As shown by reference number 206, an update is processed by the event source system. For example, the event source system may process an event associated with the status. The update may be processed in association with adding a record to a record log that is associated with an occurrence of an event (e.g., a record that indicates a payment to a financial account associated with the user account). As shown by reference number 208, the message management system may detect the update. For example, the message management system may detect the update based on identifying or detecting a new record being added to the record log (e.g., a record associated with a payment by the user).

As shown by reference number 210, the message management system may update the message. For example, the message management system may update the message to reflect the change to a parameter associated with the service (e.g., a change in a value of an amount due, a change in a balance associated with the account, and/or a change in whether a minimum payment has been received). As shown by reference number 212, at time T M, the message management system sends the updated message to the user device, as described elsewhere herein.

As indicated above, FIG. 2 is provided as an example. Other examples may differ from what is described with respect to FIG. 2.

Figure 3:
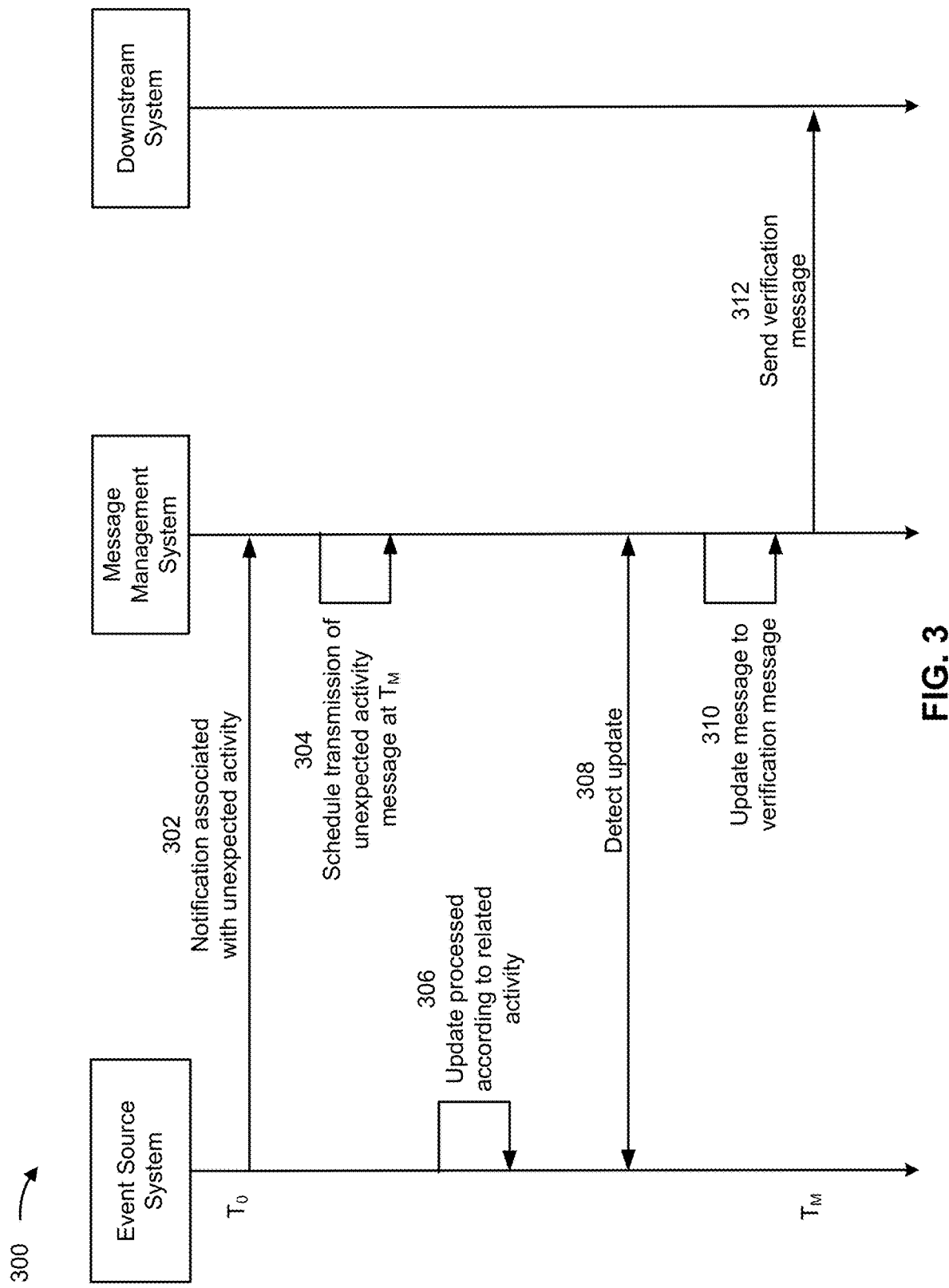

FIG. 3 is a diagram illustrating an example call flow 300 associated with managing a message for a user account. As shown in FIG. 3, a message management system, an event source system, and a user device may communicate with one another. The user device may be associated with a user and/or may be used, by the user, to manage a user account, as described herein.

As shown by reference number 302, at time $T_0$, the event source system provides a notification associated with an unexpected activity. For example, the unexpected activity may be associated with a transaction involving the user account in an unexpected location (e.g., a location outside of a home area of the user), which may be indicative of a fraudulent transaction. Accordingly, the notification may be associated with a location-based fraud detection service or a location-based fraud protection service. As shown by reference number 304, the message management system schedules a transmission of an unexpected activity message at time T M.

As shown by reference number 306, an update is processed by the event source system. For example, the event source system may process an event associated with the user indicating a location of the user, the user device indicating a location of the user, the user indicating an authorized area associated with using the user account, or the like. As shown by reference number 308, the message management system may detect the update. For example, the message management system may detect the update based on identifying or detecting a change to an authorized area for use of the user account and/or a change in a known location of the user.

As shown by reference number 310, the message management system may update the unexpected activity message regarding use of the user account in an unexpected location to a verification message associated with the update. For example, the message management system may update the message to provide a verification to the user that the location of the user or an authorized area for use of the user account has been received. As shown by reference number 312, at time $T_M$, the message management system sends the verification message to the user device, as described elsewhere herein.

As indicated above, FIG. 3 is provided as an example. Other examples may differ from what is described with respect to FIG. 3.

Figure 4:
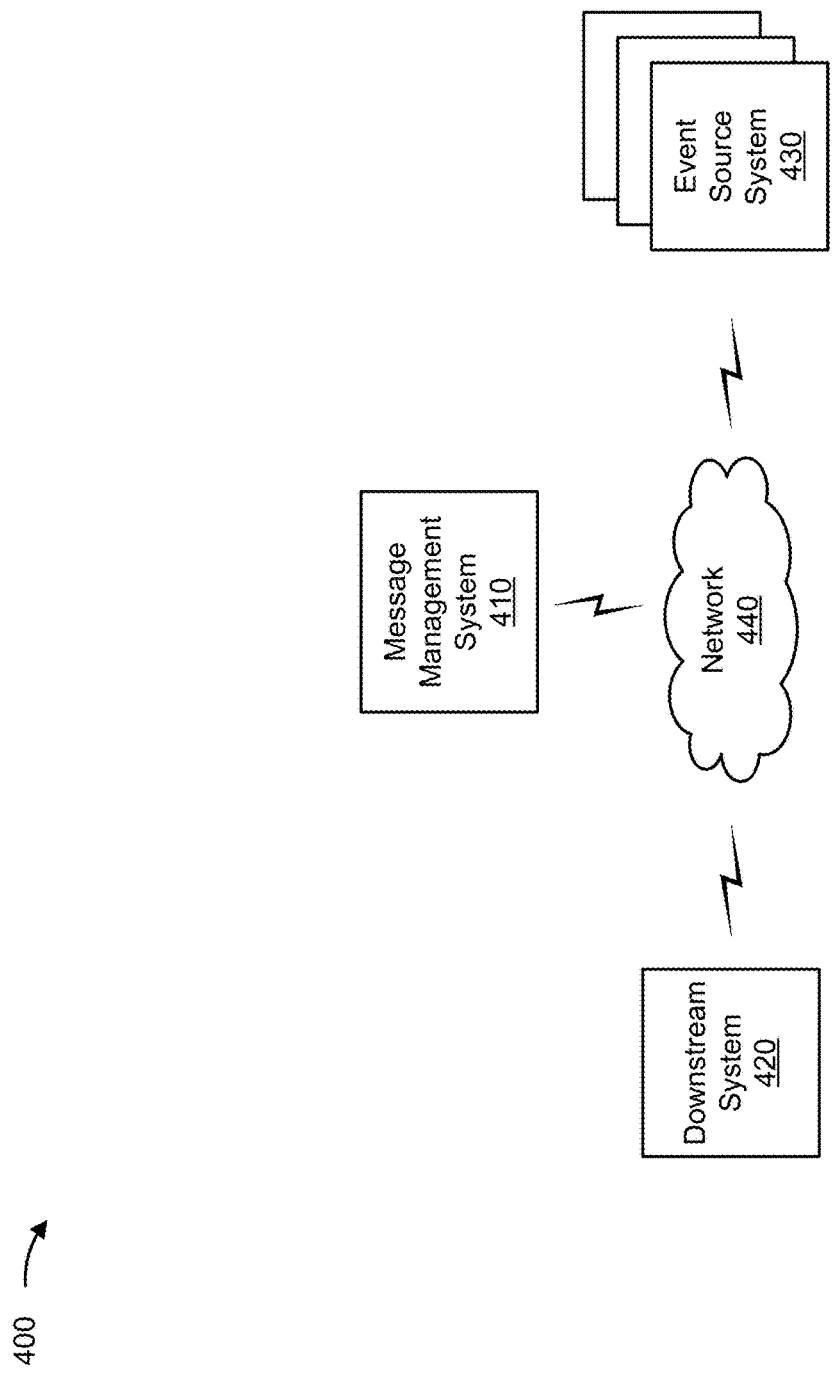
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a message management system 410, a downstream system 420, an event source system 430, and a network 440. Devices of environment 400 may interconnect via wired connections, wireless connections, or a combination of wired and wireless connections.

The message management system 410 includes one or more devices capable of receiving, generating, storing, processing, providing, and/or routing information associated with managing messages for a user account, as described elsewhere herein. The message management system 410 may include a communication device and/or a computing device. For example, the message management system 410 may include a server, such as an application server, a client server, a web server, a database server, a host server, a proxy server, a virtual server (e.g., executing on computing hardware), or a server in a cloud computing system. In some implementations, the message management system 410 includes computing hardware used in a cloud computing environment.

The downstream system 420 includes one or more devices capable of receiving, generating, storing, processing, and/or providing information associated with an entity and/or a user associated with the entity, as described elsewhere herein. The downstream system 420 may include a communication device and/or a computing device. For example, the downstream system 420 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. Additionally, or alternatively, the downstream system 420 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device.

The event source system 430 includes one or more devices capable of receiving, generating, storing, processing, and/or providing information associated with one or more events associated with a service and/or a user account, as described elsewhere herein. The event source system 430 may include a communication device and/or a computing device. For example, the event source system 430 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The event source system 430 may communicate with one or more other devices of environment 400, as described elsewhere herein.

The network 440 includes one or more wired and/or wireless networks. For example, the network 440 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 440 enables communication among the devices of environment 400.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
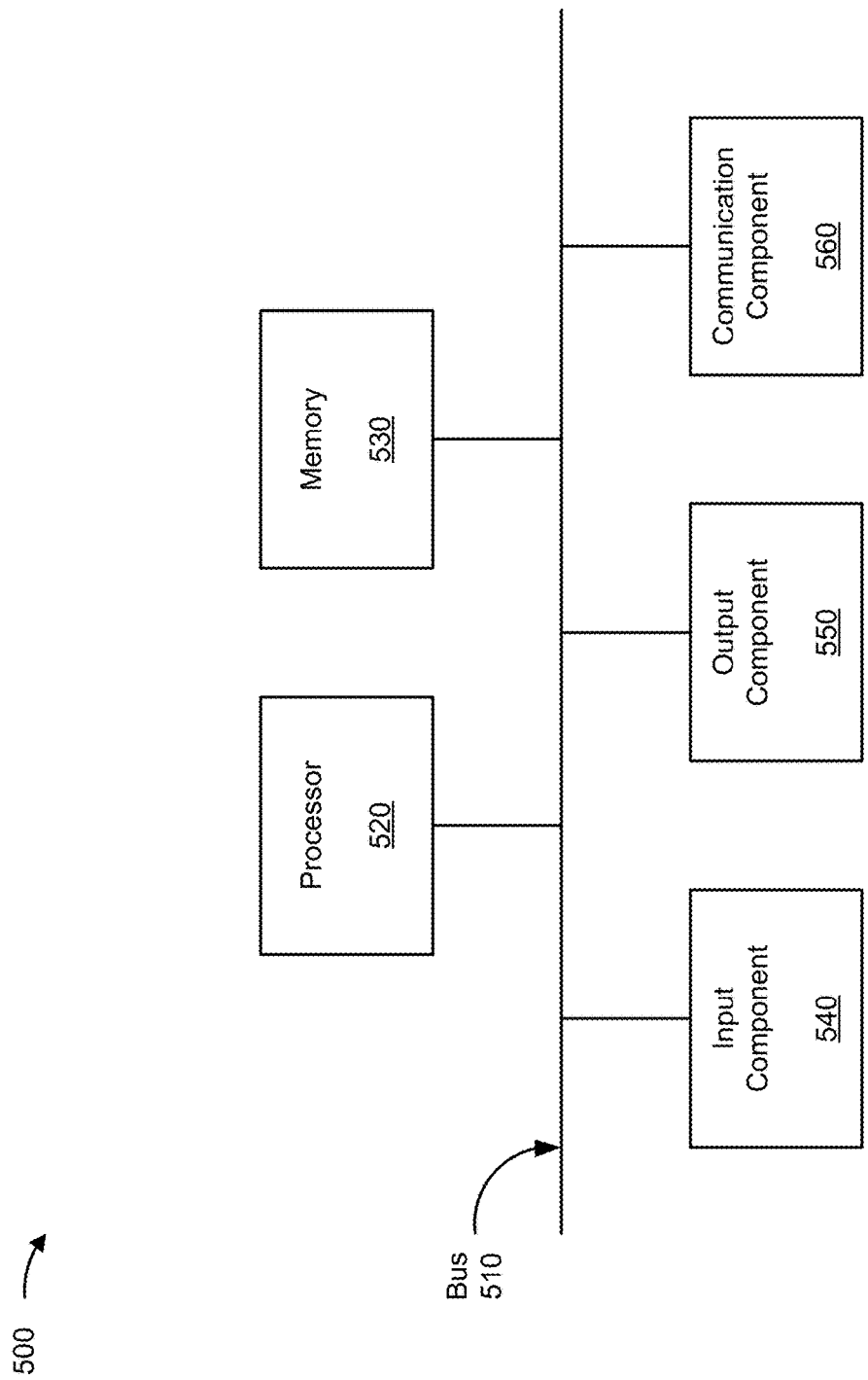
FIG. 5 is a diagram of example components of one or more devices of FIG. 4.

FIG. 5 is a diagram of example components of a device 500, which may correspond to the message management system 410, the downstream system 420 and/or the event source system 430. In some implementations, the message management system 410, the downstream system 420 and/or the event source system 430 include one or more devices 500 and/or one or more components of device 500. As shown in FIG. 5, device 500 may include a bus 510, a processor 520, a memory 530, an input component 540, an output component 550, and a communication component 560.

Bus 510 includes one or more components that enable wired and/or wireless communication among the components of device 500. Bus 510 may couple together two or more components of FIG. 5, such as via operative coupling, communicative coupling, electronic coupling, and/or electric coupling. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform one or more operations or processes described elsewhere herein.

Memory 530 includes volatile and/or nonvolatile memory. For example, memory 530 may include random access memory (RAM), read only memory (ROM), a hard disk drive, and/or another type of memory (e.g., a flash memory, a magnetic memory, and/or an optical memory). Memory 530 may include internal memory (e.g., RAM, ROM, or a hard disk drive) and/or removable memory (e.g., removable via a universal serial bus connection). Memory 530 may be a non-transitory computer-readable medium. Memory 530 stores information, instructions, and/or software (e.g., one or more software applications) related to the operation of device 500. In some implementations, memory 530 includes one or more memories that are coupled to one or more processors (e.g., processor 520), such as via bus 510.

Input component 540 enables device 500 to receive input, such as user input and/or sensed input. For example, input component 540 may include a touch screen, a keyboard, a keypad, a mouse, a button, a microphone, a switch, a sensor, a global positioning system sensor, an accelerometer, a gyroscope, and/or an actuator. Output component 550 enables device 500 to provide output, such as via a display, a speaker, and/or a light-emitting diode. Communication component 560 enables device 500 to communicate with other devices via a wired connection and/or a wireless connection. For example, communication component 560 may include a receiver, a transmitter, a transceiver, a modem, a network interface card, and/or an antenna.

Device 500 may perform one or more operations or processes described herein. For example, a non-transitory computer-readable medium (e.g., memory 530) may store a set of instructions (e.g., one or more instructions or code) for execution by processor 520. Processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry is used instead of or in combination with the instructions to perform one or more operations or processes described herein. Additionally, or alternatively, processor 520 may be configured to perform one or more operations or processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
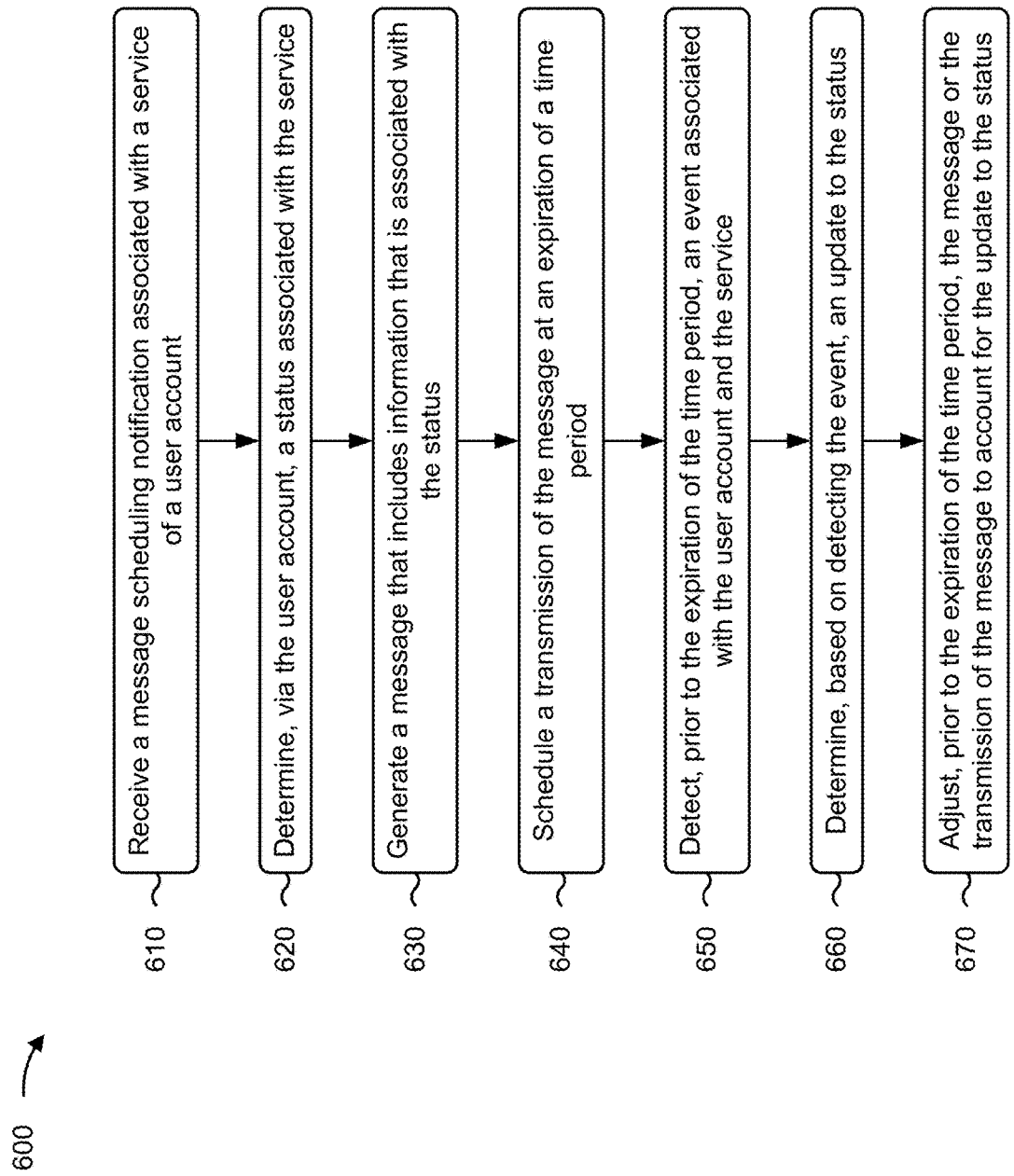
FIG. 6 is a flowchart of an example process associated with managing one or more message for a user account

FIG. 6 is a flowchart of an example process 600 associated with managing one or more messages for a user account. In some implementations, one or more process blocks of FIG. 6 may be performed by a message management system (e.g., the message management system 410). In some implementations, one or more process blocks of FIG. 6 may be performed by another device or a group of devices separate from or including the message management system, such as the downstream system 420 and/or the event source system 430. Additionally, or alternatively, one or more process blocks of FIG. 6 may be performed by one or more components of device 500, such as processor 520, memory 530, input component 540, output component 550, and/or communication component 560.

As shown in FIG. 6, process 600 may include receiving a message scheduling notification associated with a service of a user account (block 610). As further shown in FIG. 6, process 600 may include determining, via the user account, a status associated with the service (block 620). As further shown in FIG. 6, process 600 may include generating a message that includes information that is associated with the status (block 630).

As further shown in FIG. 6, process 600 may include scheduling a transmission of the message at an expiration of a time period (block 640). As further shown in FIG. 6, process 600 may include detecting, prior to the expiration of the time period, an event associated with the user account and the service (block 650).

As further shown in FIG. 6, process 600 may include determining, based on detecting the event, an update to the status (block 660). As further shown in FIG. 6, process 600 may include adjusting, prior to the expiration of the time period, the message or the transmission of the message to account for the update to the status (block 670).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memories; and
one or more processors, communicatively coupled to the one or more memories, configured to:
monitor an event source system associated with processing events associated with a service,
wherein the service is associated with a transmission of a message at an expiration of a time period;
detect, prior to the expiration of the time period, an event associated with the service;
determine, based on detecting the event, an update to a status associated with the service;
determine an adjustment for the message based on using a machine learning model,
wherein the machine learning model is trained based on one or more historical parameters associated with historically adjusted messages; and
adjust, prior to the expiration of the time period, the message based on the adjustment to account for the update to the status.

2. The system of claim 1, wherein the one or more processors, to detect the event, are configured to:
detect the event based on the event source system processing event information associated with the event.

3. The system of claim 1, wherein the one or more processors, to detect the event, are configured to:
detect the event based on detecting a user input associated with interaction with a user account associated with the service.

4. The system of claim 1, wherein the one or more processors, to determine the status, are configured to:
determine that the update to the status includes an adjustment to a user account that corresponds to a type of the event or an occurrence of the event.

5. The system of claim 1, wherein the machine learning model is associated with a natural language processing model to analyze the message.

6. The system of claim 1, wherein the one or more processors, to adjust the message, are configured to:
replace the message with a verification message associated with confirming a location.

7. The system of claim 1, wherein the status includes one or more of:
a status associated with a user receiving the service,
a status associated with a user engaging in an activity associated with the service,
a status associated with an authentication of a user,
a status associated with a location of a user, or
a status associated with a location of receiving the service.

8. A method, comprising:
monitoring, by a system, an event source system associated with processing events associated with a service,
wherein the service is associated with a transmission of a message at an expiration of a time period;
detecting, by the system and prior to the expiration of the time period, an event associated with the service;
determining, by the system and based on detecting the event, an update to a status associated with the service;
determining, by the system, an adjustment for the message based on using a machine learning model,
wherein the machine learning model is trained based on one or more historical parameters associated with historically adjusted messages; and
adjusting, by the system and prior to the expiration of the time period, the message based on the adjustment to account for the update to the status.

9. The method of claim 8, wherein detecting the event comprises:
detecting the event based on the event source system creating or storing a record associated with the event.

10. The method of claim 8, wherein detecting the event comprises:
detecting the event based on receiving an event notification,
wherein the event notification indicates that a user made a payment in association with an account.

11. The method of claim 8, wherein adjusting the message comprises:
canceling the transmission of the message based on an occurrence of the event making the status outdated.

12. The method of claim 8, wherein the machine learning model is associated with a natural language processing model to adjust content of the message.

13. The method of claim 8, wherein the status indicates one or more parameters associated with an account.

14. The method of claim 8, wherein the service is associated with managing a record log associated with an account.

15. A non-transitory computer-readable medium storing a set of instructions, the set of instructions comprising:
one or more instructions that, when executed by one or more processors of a system, cause the system to:
monitor an event source system associated with processing events associated with a service,
wherein the service is associated with a transmission of a message at an expiration of a time period;
detect, prior to the expiration of the time period, an event associated with the service;
determine, based on detecting the event, an update to a status associated with the service;
determine an adjustment for the message based on using a machine learning model,
wherein the machine learning model is trained based on one or more historical parameters associated with historically adjusted messages; and
adjust, prior to the expiration of the time period, the message based on the adjustment to account for the update to the status.

16. The non-transitory computer-readable medium of claim 15, wherein the one or more instructions, that cause the system to detect the event, cause the system to:
detect the event based on receiving an event notification.

17. The non-transitory computer-readable medium of claim 15, wherein the one or more instructions, that cause the system to detect the event, cause the system to:
detect the event based on querying the event source system prior to the expiration of the time period.

18. The non-transitory computer-readable medium of claim 15, wherein the one or more instructions, that cause the system to adjust the message, cause the system to:
form an updated message that includes updated information.

19. The non-transitory computer-readable medium of claim 15, wherein the one or more instructions further cause the system to:
schedule another transmission of another message.

20. The non-transitory computer-readable medium of claim 15, wherein the status indicates one or more of:
 a minimum payment account for an upcoming payment,
 a balance associated with a financial account, or
 a due date of an upcoming payment.

* * * * *